United States Patent
Holt et al.

(10) Patent No.: US 11,885,671 B2
(45) Date of Patent: Jan. 30, 2024

(54) FIELD SPECTRAL RADIOMETERS INCLUDING CALIBRATION ASSEMBLIES

(71) Applicant: Labsphere, Inc., North Sutton, NH (US)

(72) Inventors: Jeffrey William Holt, Concord, NH (US); Mark Duquette, Andover, NH (US); Michael Wellington Dann, Enfield, NH (US); Erik A. Skarin, Sunapee, NH (US); Joseph William Jablonski, Bradford, NH (US); Brandon James Russell, Nashua, NH (US)

(73) Assignee: Labsphere, Inc., North Sutton, NH (US)

( * ) Notice: Subject to any disclaimer, the term of this patent is extended or adjusted under 35 U.S.C. 154(b) by 279 days.

(21) Appl. No.: 17/238,258

(22) Filed: Apr. 23, 2021

(65) Prior Publication Data

US 2021/0381891 A1    Dec. 9, 2021

Related U.S. Application Data

(60) Provisional application No. 63/033,917, filed on Jun. 3, 2020.

(51) Int. Cl.
*G01J 3/02* (2006.01)
*G01J 3/28* (2006.01)
(Continued)

(52) U.S. Cl.
CPC ............ *G01J 3/0297* (2013.01); *G01J 3/021* (2013.01); *G01J 3/0218* (2013.01);
(Continued)

(58) Field of Classification Search
CPC ........ G01J 3/0297; G01J 3/021; G01J 3/0218; G01J 3/0254; G01J 3/18; G01J 3/2803;
(Continued)

(56) References Cited

U.S. PATENT DOCUMENTS

| | | | | |
|---|---|---|---|---|
| 4,746,798 A | * | 5/1988 | Amon | G01J 3/0243 |
| | | | | 250/347 |
| 2003/0164455 A1 | * | 9/2003 | Hughes | G01T 7/00 |
| | | | | 250/375 |

(Continued)

FOREIGN PATENT DOCUMENTS

| | | |
|---|---|---|
| KR | 101486282 B1 | 1/2015 |
| WO | WO-2009142758 A1 * | 11/2009 ........... A61B 5/0062 |

OTHER PUBLICATIONS

International Search Report and Written Opinion, issued by Korean Intellectual Property Office, acting as International Searching Authority for International Patent Application No. PCT/US2021/035327, dated Sep. 17, 2021 (11 pages total).

*Primary Examiner* — David P Porta
*Assistant Examiner* — Mamadou Faye
(74) *Attorney, Agent, or Firm* — Dinsmore & Shohl LLP

(57) ABSTRACT

A field spectral radiometer includes a support structure and a remote sensing head disposed on the support structure. The remote sensing head includes a central axis, a first optical element disposed on a first side of the central axis and defining a first optical path for a first optical channel, and a second optical element disposed on a second side of the central axis and defining second optical path for a second optical channel. An instrumentation assembly disposed on the support structure. the instrumentation assembly includes a first detection path associated with the first optical channel and a second detection path associated with the second optical channel, the first and second detection path include optical indexers for manipulating the first and second optical (Continued)

channels. The field spectral radiometer may include a calibration assembly disposed on the base. The calibration assembly may include a calibrating light source for calibrating the remote sensing head.

20 Claims, 11 Drawing Sheets

(51) Int. Cl.
    *G01J 3/18*     (2006.01)
    *G01J 3/12*     (2006.01)
    *G01J 1/42*     (2006.01)

(52) U.S. Cl.
    CPC ............... *G01J 3/0254* (2013.01); *G01J 3/18* (2013.01); *G01J 3/2803* (2013.01); *G01J 2001/4266* (2013.01); *G01J 2003/1204* (2013.01); *G01J 2003/1213* (2013.01)

(58) Field of Classification Search
    CPC ....... G01J 2001/4266; G01J 2003/1204; G01J 2003/1213; G01J 3/0202; G01J 3/28; G01J 3/42; G01J 3/0286; G01J 3/0289; G01J 3/0291; G01J 3/2823
    See application file for complete search history.

(56) References Cited

U.S. PATENT DOCUMENTS

| | | | |
|---|---|---|---|
| 2004/0021078 A1* | 2/2004 | Hagler | G01J 3/06 |
| | | | 250/339.13 |
| 2006/0081777 A1* | 4/2006 | Bevan | G01J 5/602 |
| | | | 250/330 |
| 2007/0272844 A1* | 11/2007 | Dominic | G01J 3/08 |
| | | | 250/239 |
| 2009/0103081 A1 | 4/2009 | Whelan et al. | |
| 2012/0055244 A1 | 3/2012 | Dolce | |
| 2016/0273966 A1 | 9/2016 | Park et al. | |
| 2018/0288292 A1 | 10/2018 | Moggridge et al. | |
| 2018/0361571 A1 | 12/2018 | Georgeson | B25J 9/162 |
| 2019/0065850 A1* | 2/2019 | Stryjewski | G06V 10/143 |
| 2019/0137388 A1* | 5/2019 | Mallery | G01J 5/0806 |

* cited by examiner

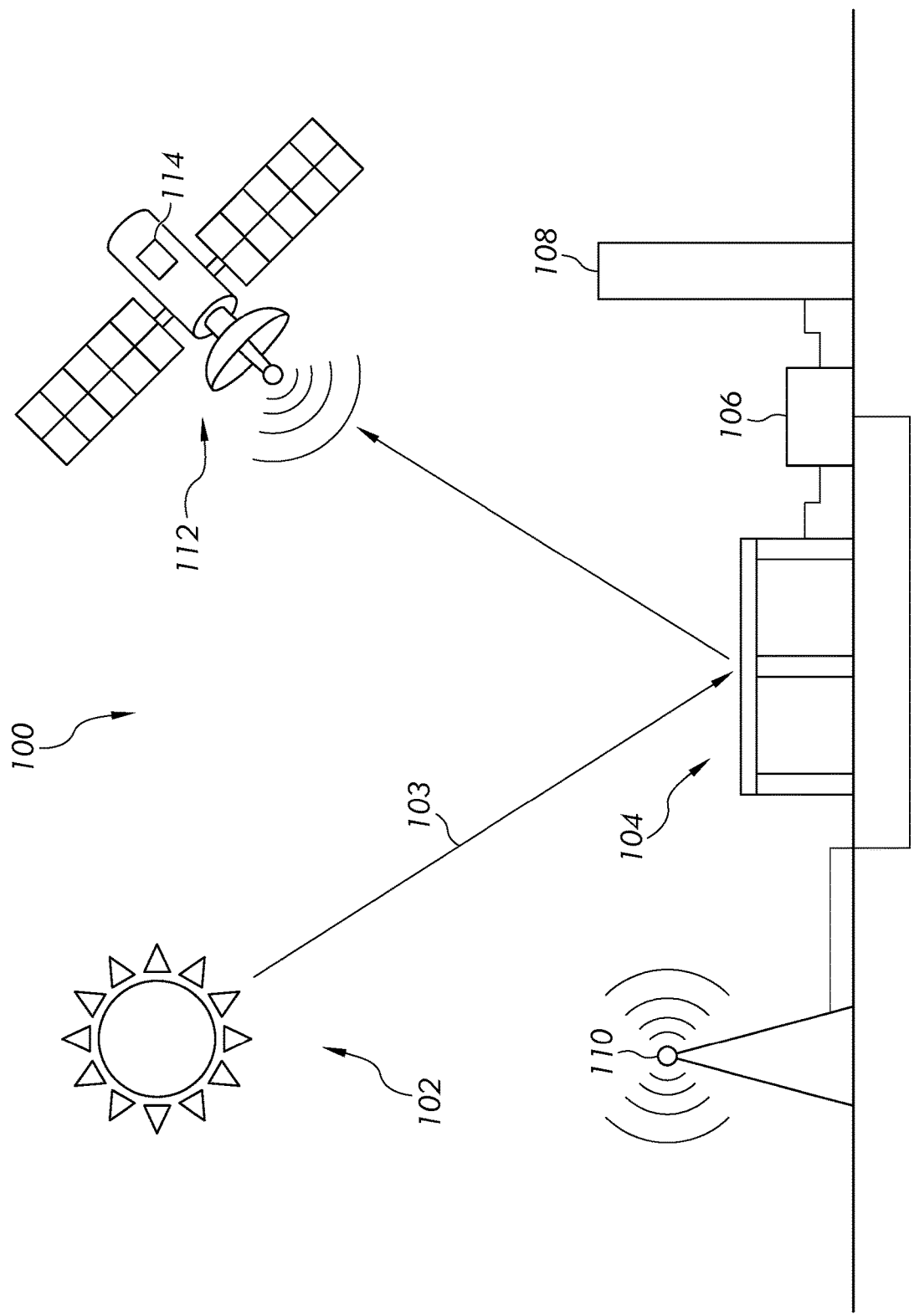

FIELD SPECTRAL RADIOMETERS INCLUDING CALIBRATION ASSEMBLIES

BACKGROUND

Field

The present specification generally relates to field spectral radiometers.

Technical Background

Remote sensing observation of real targets requires proper calibrations of imaging instrumentation to achieve quantifiable results. Many existing systems may use factory calibrations to measure radiance and do not baseline fundamental instrument performance for the actual sunlight illumination, geographic location, and atmospheric conditions in which they are used. Radiance reflected from objects in an imaged area may vary with solar, atmospheric, topographical, and obstructive (e.g., shade) conditions. Additionally, instruments used in the field often are subjected to harsh conditions, making their calibrations viable only over short time spans or a limited number of campaigns, while illumination conditions remain stable. Without proper calibration, the remote sensing platform will not collect accurate radiometric data.

SUMMARY

According to an embodiment of the present disclosure a field spectral radiometer includes a support structure and a remote sensing head disposed on the support structure. The remote sensing head includes a central axis defining a viewing direction of the field spectral radiometer, a first optical element disposed on a first side of the central axis and defining a first optical path for a first optical channel, and a second optical element disposed on a second side of the central axis, the second optical element defining second optical path for a second optical channel, wherein the first and second optical channels are associated with different wavelength ranges of interest. An instrumentation assembly is disposed on the support structure. The instrumentation assembly includes a first detection path associated with the first optical channel and a second detection path associated with the second optical channel. The first detection path includes a first optical indexer to filter light reflected by the first optical element. The second detection path includes a second optical indexer to filter light reflected by the second optical element.

According to another embodiment of the present disclosure, a field spectral radiometer includes a base and a deployment arm extending from an end of the base. The deployment arm includes a first portion connected to the base, a second portion, and a rotating connection extending between the first portion and the second portion, the rotating connection defining a first axis of rotation extending in a first direction. The radiometer also includes a rotating support coupled to an end of the second portion and a remote sensing head coupled to the rotating support. The rotating support includes elements that are adjustable to control a pan and a tilt of the remote sensing head. The radiometer also includes a calibration assembly disposed on the base, the calibration assembly including a calibrating light source comprising an opening. The deployment arm rotates about the first axis of rotation such that the second portion rotates relative to the first portion to place the remote sensing in a calibrating position where the field of view of the calibration assembly receives light from the calibrating light source.

According to another embodiment of the present disclosure, a method of calibrating a remote sensing system includes measuring a solar radiance, an atmospheric transmission, and a reflectance of a surface using a multi-channel field spectral radiometer by manipulating a field of view of the multi-channel spectral radiometer while collecting radiometric data. The multi-channel field spectral radiometer includes a remote sensing head coupled to a base via a deployment arm. The multi-channel field spectral radiometer receives light within the remote sensing head and provides light to detectors of an instrumentation assembly attached to the base. The method also includes reflecting solar light towards the remote sensing system via a reflector array. The method also includes receiving an image signal from the remote sensing system generated from the reflected solar light. The method also includes adjusting the image signal based on at least one of the solar radiance, the atmospheric transmission, the reflectance of the surface measured via the multi-channel field spectral radiometer.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 schematically depicts an imager characterization system, according to one or more embodiments described herein;

DETAILED DESCRIPTION

Figure 2A:
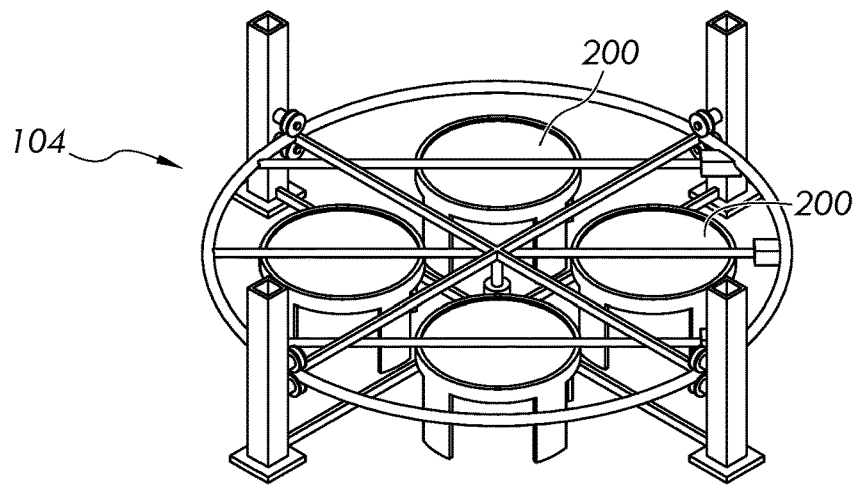
FIG. 2A schematically depicts a reflector assembly of the imager characterization system of FIG. 1 with a plurality of reflectors in a stowed position, according to one or more embodiments described herein.

Reference will now be made in detail to embodiments of field spectral radiometers and methods pertaining to the same. The field spectral radiometers disclosed herein may be incorporated into an imager characterization and/or calibration system in which light from an illumination source is directed to an imaging system to calibrate the imaging system. The field spectral radiometers described herein may characterize the light from the illumination source and/or measure other factors impacting signals generated by the imaging system (e.g., atmospheric transmittance, background surface reflectance, etc.) to facilitate post-processing the signals for accurate assessments of imaging system performance. To provide flexibility for use in calibrating a plurality of types of imaging systems (e.g., varying in detector size, ground sampling distance, spectral band, and the like), the field spectral radiometer described herein is capable of performing measurements throughout the ultraviolet ("UV"), visible ("VIS"), near infrared ("NIR"), and short-wave infrared ("SWIR") portions of the electromagnetic spectrum. In this regard, the field spectral radiometer includes two or more optical paths, with each of the optical paths being associated with a different optical channel. Each optical path may provide light in a separate wavelength range of interest to a separate detection path including a detector and set of filters designed for that spectral range of interest to facilitate measurement with adequately low uncertainty for accurately characterizing imaging system components in each wavelength range of interest. Such channel separation facilitates the field spectral radiometers described herein having a high dynamic range to facilitate a broad array of measurements, ranging from direct measurement of the solar disc to surface level spectral reflections, while achieving a relatively high signal-to-noise ratio ("SNR"). In embodiments, the field spectral radiometer achieves a minimum signal-to-noise ratio of 10 and a dynamic range of at least $1.5 \times 10^{-5}$.

In an additional aspect, the field spectral radiometer may also include a calibration assembly including a calibrated light source. The calibrated light source may be disposed in a housing adaptable to receive a remote sensing head when the remote sensing head is moved to a calibration position. When the remote sensing head is received in the housing, the remote sensing head observes light emitted from the calibrated light source while the two or more optical paths are in full measurement configurations (e.g., have full path lengths between optical components) to facilitate correcting for variations in performance of the remote sensing head (e.g., caused by debris on a viewing window). Performance of the calibrating light source can be monitored during use via a calibration sensor to ensure that calibration signals measured by detectors associated with each of the two or more optical paths are obtained while the calibrated light source is operating within pre-determined performance metrics. Such calibrations of each optical path may be performed while the field spectral radiometer is deployed in an operational environment to ensure proper calibration of imaging systems in real time.

FIG. 1 schematically depicts an imager characterization system 100, according to an example embodiment. The imager characterization system 100 includes an illumination source 102, a reflector array 104, a control system 106, and a field spectral radiometer 108. The imager characterization system 100 is generally configured to direct light from an illumination source 102 to an imaging system 112 to facilitate calibration of the imaging system 112 while the imaging system 112 is in deployment. The illumination source 102 provides illumination light for generating samples for characterizing the imaging system 112. In the example shown, the illumination source 102 is sunlight, though other illumination sources are contemplated and within the scope of the present disclosure. In embodiments, the reflector array 104 and control system 106 comprise one of a plurality of reference sites that are a part of a calibration network for characterizing the imaging system 112.

The control system 106 communicates with the imaging system 112 via antennas 110 and controls the reflector array 104. In embodiments, the imager characterization system 100 provides on demand calibration for the imaging system 112 in response to a calibration request. For example, in embodiments, the imaging system 112 transmits the calibration request to the imager characterization system 100 (e.g., via any known communication protocol). The calibration request may indicate a calibration time when the reflector array 104 is within a field of view of the imaging system 112. At the indicated time, the control system 106 may control the field spectral radiometer 108 to obtain measurements of one or more of solar radiance, atmospheric transmission, and reflectance from the reflector array 104. The control system 106 may also control the reflector array 104 to direct illumination light from the illumination source 102 to the imaging system 112 for calibration. The spectral radiance and/or irradiance of the illumination source 102 (e.g., of the sun and sky), atmospheric transmission, and the like may be measured by the field spectral radiometer 108. In embodiments, the orientation of the field spectral radiometer 108 is adjustable to acquire a complete survey of the environment of the reflector array 104 to facilitate proper adjustments to the samples generated by the imaging system 112. In embodiments, the imager characterization system 100 includes a camera (not depicted). The camera may be co-located with a remote sensing head of the field spectral radiometer 108 and be used for alignment, tracking, and targeting to ensure that the field spectral radiometer 108 is sampling a desired target. The structure of the field spectral radiometer 108 that may be used in the imager characterization system 100 is described in greater detail herein.

The imaging system 112 is depicted as a satellite imaging system, but it should be understood that the systems and methods described herein are applicable to any airborne imaging system (e.g., imaging systems disposed on unmanned aerial vehicles or other aircraft). In the depicted embodiment, the imaging system 112 includes one or more sensors 114. The one or more sensors 114 are generally configured to generate images based on radiation within a wavelength range of interest. The wavelength range of interest may vary depending on the implementation. For example, in embodiments, the one or more sensors 114 may generate images based on one or more of ultraviolet radiation, visible light, infrared radiation, and even the millimeter wavelength range or radio frequency, depending on the implementation.

The imaging system 112 may perform a number of different types of imaging of targets depending on the situation or implementation. For example, in embodiments, the imaging system is a remote sensing system using broadband, multi-spectral, and/or hyperspectral imaging instruments. Such instrumentation requires proper calibration in order to achieve reliable characterizations of the targets being imaged because the acquired imaging signal by the one or more sensors 114 may vary depending on a number of different factors, such as angle of illumination (e.g., orientation of the illumination source 102), the spectral composition of illumination light from the illumination source 102, atmospheric conditions, and reflectance of surfaces disposed proximate to the reflector array 104 (e.g., the bidirectional reflectance distribution function ("BRDF") of the surface upon which the reflector array 104 is disposed). To facilitate accurate calibration of a wide array of imaging systems (including the imaging system 112), the field spectral radiometer 108 includes two or more optical paths coupled to detector paths specifically designed for different optical channels (e.g., wavelength ranges of interest), providing for high dynamic range and low signal to noise environmental measurements across a large spectral range.

While the field spectral radiometer 108 is depicted to be a component of the imager characterization system 100, it should be appreciated that the field spectral radiometer 108 may find use in a wide variety of other contexts or as a standalone device. The field spectral radiometer 108 may find use in any application where it is beneficial to gather information regarding solar illumination and/or surface reflectance. For example, information generated by the field spectral radiometer may provide inputs in atmospheric science (e.g., to collect information regarding sunlight, in studying climate, in developing weather models). In embodiments, the field spectral radiometer 108 may be used in photovoltaic installations. In embodiments, the field spectral radiometer 108 may be implemented in farming or agricultural sites for solar and/or surface monitoring. The present disclosure is not limited to any particular application.

Figure 2B:
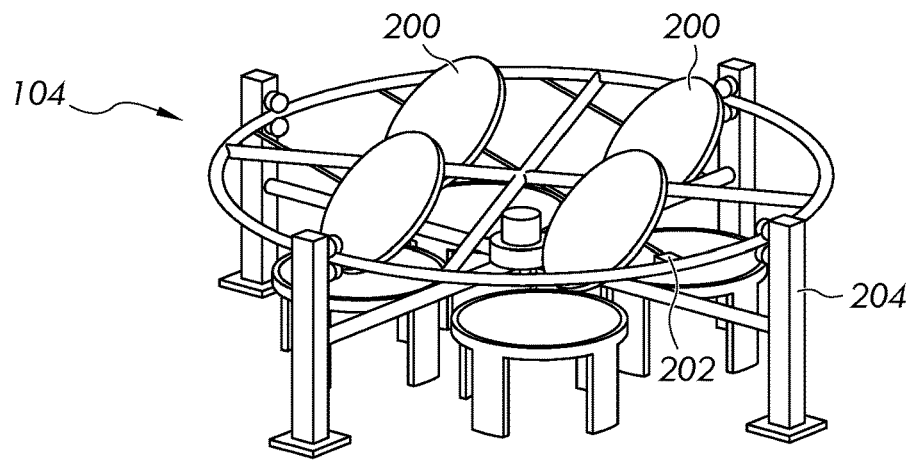
FIG. 2B schematically depicts a reflector assembly of the imager characterization system of FIG. 1 with a plurality of reflectors transitioning from the stowed position depicted in FIG. 2A, according to one or more embodiments described herein.
Figure 2C:
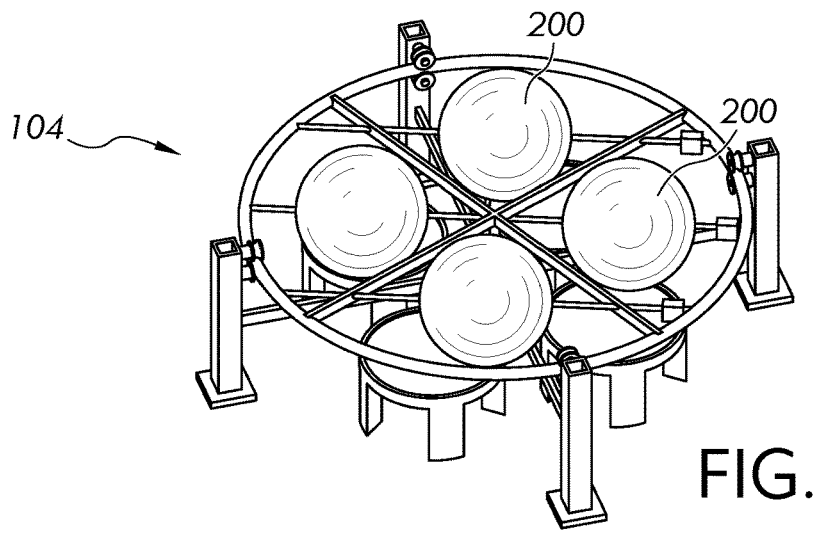
FIG. 2C schematically depicts a reflector assembly of the imager characterization system of FIG. 1 with a plurality of reflectors in a reflecting position, according to one or more embodiments described herein.

FIGS. 2A, 2B, and 2C schematically depict an example embodiment of the reflector array 104 in greater detail. FIG. 2A depicts the reflector array 104 with a plurality of reflectors 200 in a stowed position where light from the illumination source 102 is not reflected towards the imaging system 112. FIG. 2B depicts the reflector array 104 in an opening state while the plurality of reflectors 200 are being rotated from the stowed position depicted in FIG. 2A. FIG. 2C depicts the reflector array 104 in a reflecting position where the reflector array 104 is positioned to direct light from the illumination source 102 into the field of view of the imaging system 112. In the depicted embodiment, the reflector array 104 includes a plurality of reflectors 200. The plurality of reflectors 200 are arranged in a 2×2 array, although other arrangements and numbers of reflectors are contemplated and within the scope of the present disclosure.

In embodiments, each reflector 200 of the reflector array 104 is similarly shaped and sized. Each reflector 200 may be concave, convex, or flat, depending on the implementation. In embodiments, each reflector 200 is sized less than an instantaneous geometric field of view ("IGFOV") of an individual detector element (e.g., pixel) the imaging system 112. That is, each of the reflectors 200 may have a surface area facing the illumination source 102 that is less than or equal to a geometric area captured by one of the detector elements. In embodiments, the IGFOV of one of detector elements may be approximated as $$IGFOV = \frac{ah}{f} \tag{1}$$

where a represents the dimension of one of the detector elements (e.g., in embodiments where each detector elements is an a×a square pixel), f is the effective focal length of an optical system (not depicted) of the imaging system 112, and h is the height of the optical system above of the reflector array 104 (e.g., the orbital height of the imaging system 112). That is, light reflected from each of the reflectors 200 may represent a point illumination source that is imaged by the imaging system 112. In embodiments, the reflector array 104 includes a plurality of arrays of reflectors within a single IGFOV of the imaging system 112.

Referring to FIG. 2B, in embodiments, each of the plurality of reflectors 200 is coupled to a support platform 202 via an actuator (not depicted). The actuator may rotate each reflector 200 responsive to control signals received from the control system 106 (see FIG. 1) to position the reflectors 200 to reflect light from the illumination source 102 towards the imaging system 112 to generate an image of a point illumination source. In embodiments, when not being used to calibrate the imaging system 112, the reflectors 200 are positioned in direct contact with one of the support platforms 202 to protect the reflective surfaces of the reflectors 200 while not in use (see FIG. 2A). The support platforms are integrated into a support structure 204 that provides structural support for the reflector array 104.

The plurality of reflectors 200 therefore reflect illumination light from the illumination source 102 such that the imaging system 112 generates an imaging signal with the illumination light. The field spectral radiometer 108, by characterizing both the illumination source 102 and other factors (e.g., positioning of the illumination source 102, atmospheric transmission, environmental reflectance, etc.) while the imaging system 112 is generating the imaging signal, facilitates post processing of the imaging signal based on factors external to the imaging system 112 to facilitate accurate calibration of the imaging system 112 based on the imaging signal. Full characterization of the illumination source 102 and other factors by the field spectral radiometer 108 prevents improper calibration of the imaging system 112, which may lead to degraded imaging performance after calibration.

Figure 3A:
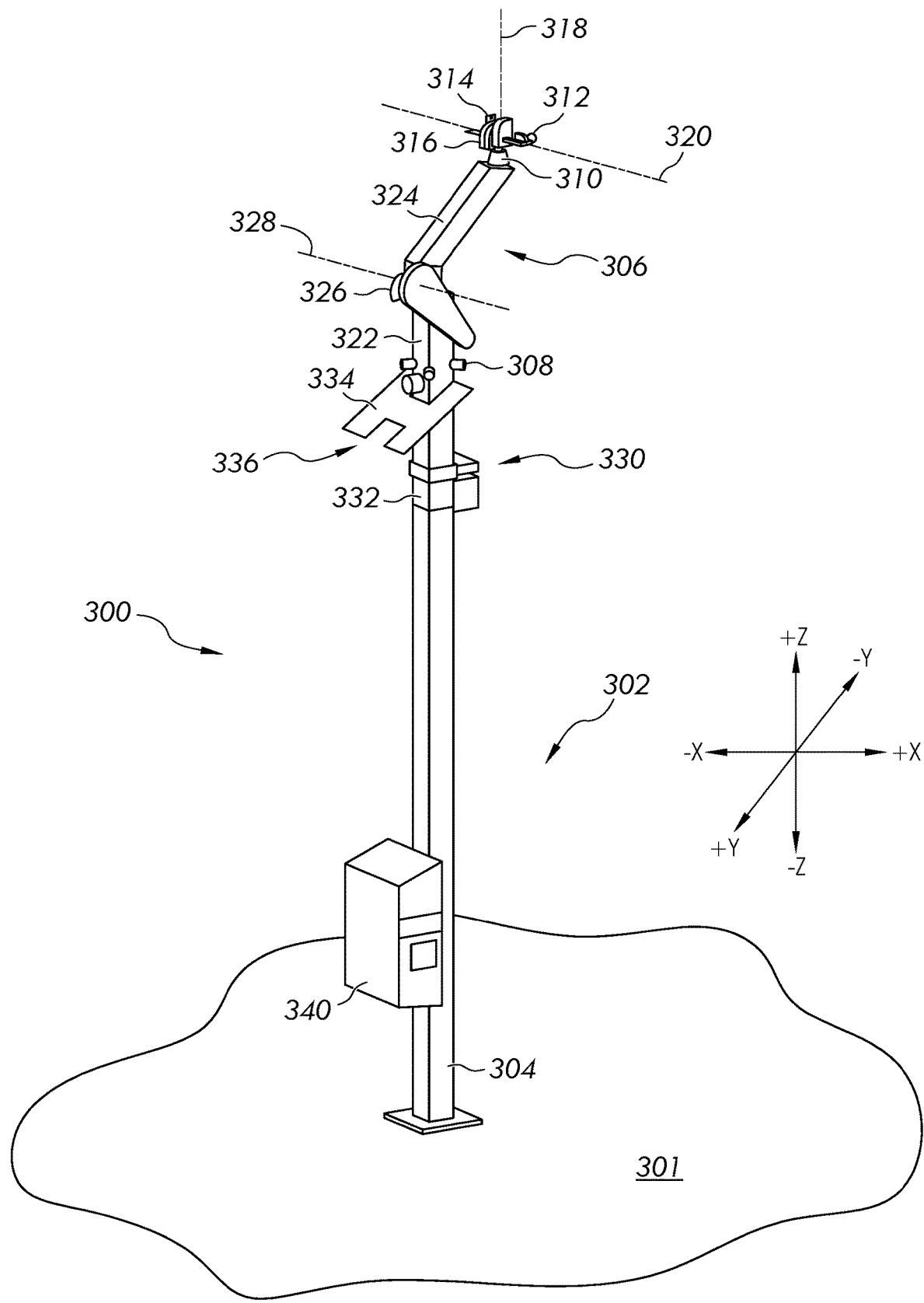
FIG. 3A schematically depicts a field spectral radiometer, according to one or more embodiments described herein.
Figure 3B:
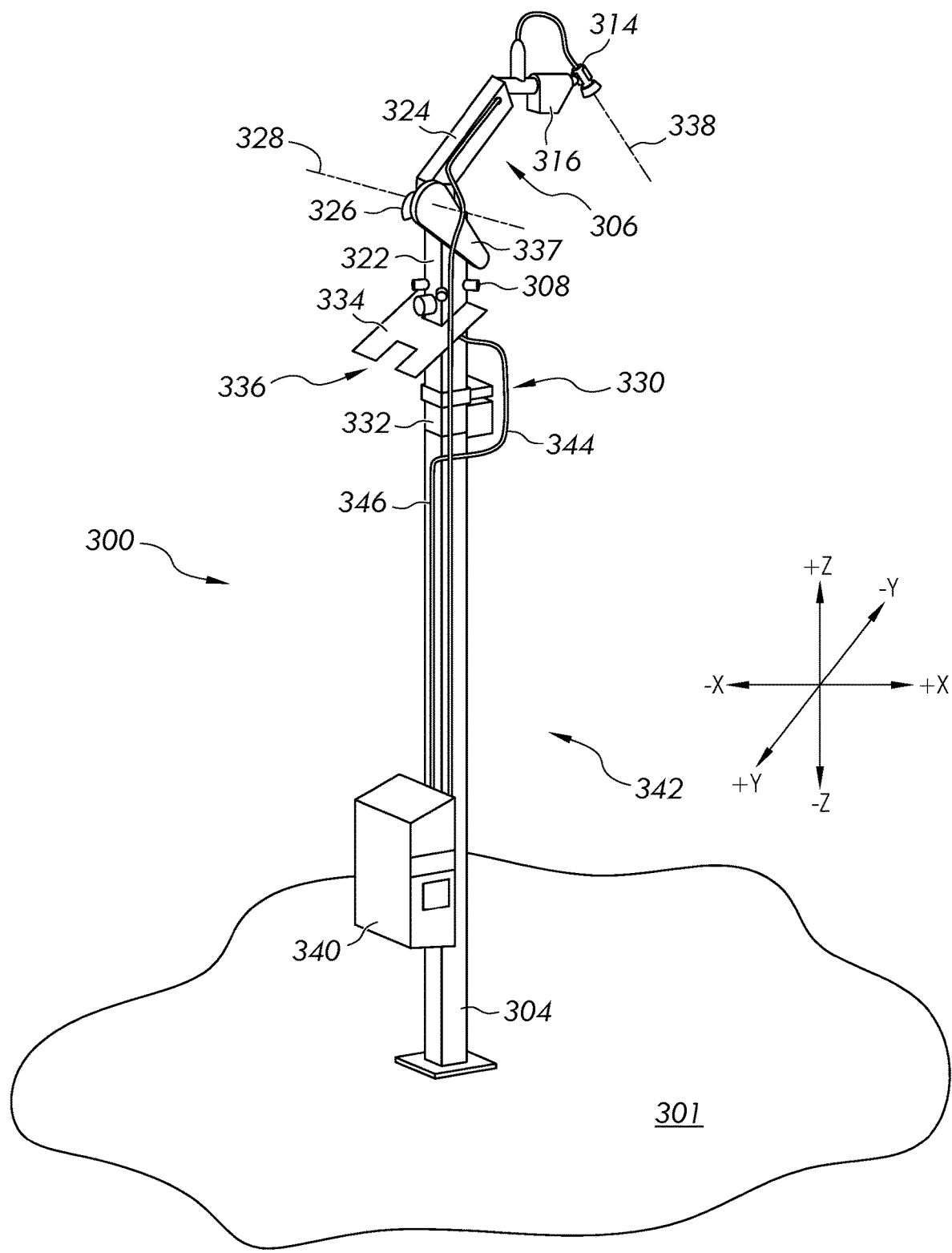
FIG. 3B schematically depicts a camera and fiber connection assembly of the field spectral radiometer depicted in FIG. 3A, according to one or more embodiments described herein.
Figure 3C:
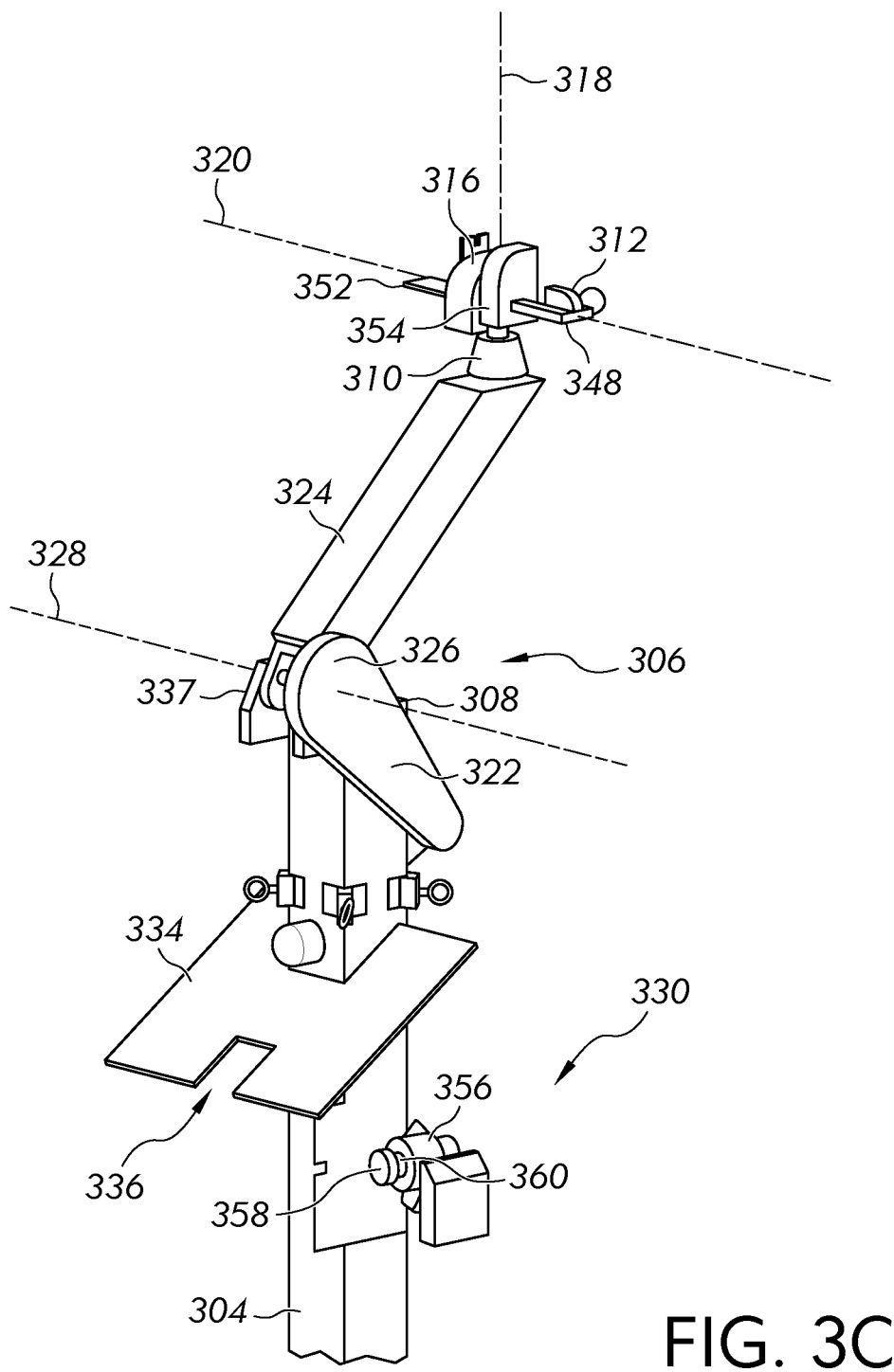
FIG. 3C schematically depicts a deployment arm of the field spectral radiometer depicted in FIG. 3A, according to one or more embodiments described herein.

Referring now to FIGS. 3A, 3B, and 3C, a field spectral radiometer 300 is schematically depicted. In embodiments, the field spectral radiometer 300 is used as the field spectral radiometer 108 of the imager characterization system 100 described herein. FIG. 3A depicts a perspective view of the field spectral radiometer 300 with a support structure 302 thereof being in a measurement position. FIG. 3B depicts a perspective view of the field spectral radiometer 300 with the support structure 302 in a measurement position that differs from that depicted in FIG. 3A such that a remote sensing head 312 of the field spectral radiometer 108 is viewing a surface 301 upon which the field spectral radiometer 300 is disposed to obtain reflectance measurements. FIG. 3C depicts a detailed view of a deployment arm 306 of the support structure 308 and a calibration assembly 330 of the field spectral radiometer 300.

As depicted in FIG. 3A, the field spectral radiometer 300 includes a support structure 302 disposed on a surface 301. In embodiments, the surface 301 corresponds to a surface upon which a plurality of components (e.g., the reflector array 104, the control system 106, and the antenna 110) of the imager characterization system 100 depicted in FIG. 1 are disposed. In embodiments, the surface 301 may correspond to an environmental surface or the ground (e.g., pavement, grass, water etc.). In embodiments, the field spectral radiometer 300 (and other components of the imager characterization system 100) is disposed on a movable entity or vehicle, and the surface 301 may correspond to a surface of the vehicle. The surface 301 may largely vary in reflectance attributes and have various different dependencies on viewing/illumination angle depending on the situation in which the field spectral radiometer 300 is being used.

The field spectral radiometer 300 includes a remote sensing head 312 and a camera 314 disposed at an end of the support structure 302. The support structure 302 includes a base 304 attached to the surface 301 and a deployment arm 306 extending from the end 308 of the base 304. The remote sensing head 312 and the camera 314 are attached to an end 310 of the deployment arm 306 via a rotating support 316. In embodiments, the rotating support 316 comprises a first component that is rotatable relative to the deployment arm 306 about a first axis of rotation 318 extending perpendicular to the surface 301 (in the configuration depicted in FIG. 3A) such that the azimuthal orientations of the remote sensing head 312 and the camera 314 are adjustable between 0 and 360 degrees so that the field spectral radiometer 300 is capable of conducting a complete survey of the environment. In embodiments, the remote sensing head 312 and the camera 314 are pivotally coupled to the first component of the rotating support 316 such that the remote sensing head 312 and camera 314 are rotatable about a second axis of rotation 320 extending substantially perpendicular to the first axis of rotation 318. Such pivotal coupling facilitates adjustment of elevation angles of imaging axes (e.g., central axes) of the remote sensing head 312 and the camera 314 relative to a direction of extension of the surface 301 (e.g., the X-direction of the coordinate axis depicted in FIG. 3A). In embodiments, when the deployment arm 306 is in the configuration depicted in FIG. 3A, relative angles between the imaging axes of the remote sensing head 312 and the camera 314 and the surface 301 are adjustable between −90 degrees (e.g., where the imaging axes point straight downward towards the surface 301 with the deployment arm 306 in the configuration depicted in FIG. 3A) and positive 90 degrees (e.g., where the imaging axes point straight upwards away from the surface 301) to facilitate the field spectral radiometer 300 capturing reflectance measurements from the surface 301 and radiance/irradiance measurements of the illumination source 102 (see FIG. 1) at various different orientations. In embodiments, the rotating support 316 is a pan-tilt camera mount such as the PTU-5 from FLIR® Systems, Inc.

In embodiments, the deployment arm 306 comprises a first portion 322 coupled to the end 308 of the base 304 and a second portion 324 attached to the first portion 322 by a rotating connection 326 (e.g., a joint, a hinge, an axle, or the like). The rotating connection 326 includes an actuator (not depicted in FIG. 3A) coupled to the control system 106 that rotates an end of the second portion 324 about a deployment axis 328 so that the second portion 324 can be moved between a stowed (or calibration) position and a measurement position (or a plurality of measurement positions). FIG. 3A depicts the second portion 324 in a measurement position where the field spectral radiometer 300 captures measurements of the surrounding environment. In the depicted measurement position, the second portion 324 of the deployment arm 306 extends at an angle to the first portion 322. In embodiments, when the second portion 324 is in the measurement position depicted in FIG. 3A, the remote sensing head 312 and camera 314 are disposed a height of greater than or equal to 1 meter (e.g., greater than or equal to 5 meters, greater than or equal to 10 meters) above the surface 301 to facilitate capturing measurements at a variety of viewing angles unobstructed by various objects disposed on the surface 301. The remote sensing head 312 may be disposed any distance from the surface 301, depending on the implementation.

Referring still to FIG. 3A, the field spectral radiometer 300 further includes a calibration assembly 330. As described in greater detail herein, the calibration assembly 330 comprises a calibrated light source (not depicted in FIG. 3A). The calibration assembly 330 is disposed on the base 304 and positioned to receive the remote sensing head 312 when the second portion 324 of the deployment arm 306 is placed in a stowed position. In embodiments, the calibration assembly 330 includes a housing 332 (see FIG. 5A) including an opening (not-depicted in FIG. 3A) that conforms in shape to the remote sensing head 312 such that the remote sensing head 312 and a portion of the rotating support 316 are inserted therein when in the stowed position. Such an arrangement beneficially seals the housing from external light to facilitate accurate calibration of the field spectral radiometer 300. In embodiments, a guard plate 334 is disposed on the base 304 and includes a slot 336 to receive the second portion 324 when placed in the stowed position. In embodiments, the guard plate 334 is omitted.

FIG. 3B depicts the field spectral radiometer 300 with the deployment arm 306 in a different position than that depicted with FIG. 3A. As shown, in FIG. 3B, the second portion 324 of the deployment arm 306 has been rotated about the deployment axis 328 such that the second portion 324 extends in substantially the same direction as the first portion 322 of the deployment arm 306 (e.g., the entirety of the deployment arm 306 is substantially linear in shape). FIG. 3B depicts an actuator 337 disposed at the end 308 of the base 304 proximate to the rotating connection 326. The actuator 337 rotates the second portion 324 to and from the stowed position to facilitate measurement. The rotational position of the camera 314 has been adjusted via the rotating support 316 such that an imaging axis 338 of the camera 314 extends at an angle to the surface 301 while the surface 301 is within the field of view of the camera 314 to facilitate a reflectance measurement. By manipulating the configuration of the second portion 324 of the deployment arm 306, the angular positioning of the rotating support 316 allows additional viewing angles to be within the field of view of the camera 314 and the remote sensing head 312.

The field spectral radiometer 300 also includes an instrumentation assembly 340 disposed on the base 304. As described in greater detail herein, the instrumentation assembly 340 may house detectors that generate signals from light captured in the optical paths initiated at the remote sensing head 312 so that radiometric data may be captured. The detectors may be temperature controlled to facilitate accurate measurements. Such temperature control may require bulky electronics and temperature conditioning hardware. By placing the instrumentation assembly 340 away from the point at which light is captured (e.g., the remote sensing head 312 and the camera 314), the components of the instrumentation assembly 340 do not obfuscate the fields of view of the camera 314 and remote sensing head 312. Moreover, since the light-capturing components of the camera 314 and remote sensing head 312 are relatively compact as compared to the components of the instrumentation assembly 340, such positioning of the instrumentation assembly away from the second portion 324 of the deployment arm 306 and the rotating support 316 facilitates flexible manipulation of the orientation thereof.

To provide light captured by the remote sensing head 312 to the instrumentation assembly 340, the field spectral radiometer 300 further includes a fiber assembly 342. The fiber assembly 342 includes a plurality of optical fibers extending between the remote sensing head 312 (not depicted in FIG. 3B) and the instrumentation assembly 340 to deliver light collected by the remote sensing head 312 to detection paths disposed in the instrumentation assembly 340. In embodiments, the plurality of optical fibers of the fiber assembly 342 includes one optical fiber for each optical channel measured by the field spectral radiometer 300. For example, in the depicted embodiment, the fiber assembly 342 includes a first optical fiber 344 associated with a first optical channel (e.g., including light having a wavelength greater than or equal to 0.3 µm and less than or equal to 1.1µ) and a second optical fiber 346 associated with a second optical channel (e.g., including light having a wavelength greater than or equal to 0.8 µm and less than or equal to 2.5 µm). As described in greater detail herein, the remote sensing head 312 may include optics that divides light from the illumination source 102 (or reflected from the surface 301) into spectral components and reflects the spectral components into the fibers of the fiber assembly 342. Each fiber of the fiber assembly 432 may include a core covered by a cladding layer. In embodiments, the sizing of the core is selected to achieve a desired field of view for each optical channel based on the effective aperture of optics associated with each channel. In embodiments, the fiber core diameter for the fibers in the fiber assembly is 200 µm, though other-sized fibers are contemplated and within the scope of the present disclosure. Moreover, fibers having different core size or materials for each of the optical channels may also be used.

In the depicted embodiments, the fiber assembly 342 is external to the support structure 302 and is held to the support structure via a plurality of support mounts attached to an external surface of the support structure 302. The fibers are loosely tensioned proximate to the rotating connection 326 to prevent the fiber from becoming tangled upon rotation of the second portion 324 of the deployment arm 306. It should be understood that alternative routing schemes for the fiber assembly 342 are contemplated and within the scope of the present disclosure. For example, in embodiments, the fibers may be routed inside of the support structure 302 through a cavity (not depicted) defined therein. Such a structure beneficially protects the fibers from environmental conditions. Moreover, the fibers may be routed to avoid rotating components of the actuator 337 and the rotating connection 326 to avoid fiber twisting and bending signal loss. In embodiments, the fibers of the fiber assembly 342 are bent at a radius that is greater than or equal to a minimum bending radius specified for the fiber to avoid signal loss. While the fibers are shown to continuously extend between the remote sensing head 312 and the instrumentation assembly 340, embodiments are also envisioned where optical interconnects are disposed between the remote sensing head 312 and the instrumentation assembly 340 to facilitate a particular routing scheme of the fibers (e.g., around the rotating connection 326).

FIG. 3C depicts a close-up view of the deployment arm 306. As shown, the rotating support 316 includes a first component 354 rotatable relative to the deployment arm 306 about the first axis of rotation 318. The rotating support 316 further includes support platforms 348 and 352 attached to the first component 354 via an actuator (not depicted) defining the second axis of rotation 320. The second axis of rotation 320 extends through the support platforms 348 and 350. The remote sensing head 312 and camera 314 are each mounted on one of the support platforms 348 and 350 (e.g., upper surfaces thereof when in the configuration depicted in FIG. 3C) such that fields of view of the remote sensing head 312 and camera 314 are rotatable about two axes of rotation to allow the field spectral radiometer 300 to capture a complete surface of the environment.

FIG. 3C also depicts the calibration assembly 330 with the housing 332 of FIG. 3A removed. The calibration assembly 330 includes an integrating sphere 356 with a calibrated light source (not depicted) disposed therein. In embodiments, the calibrated light source includes a broadband light source emitting light covering a combined spectral range of the optical channels measured via the remote sensing head 312. In embodiments, the calibrated light source includes a tungsten halogen light source, a plasma-based light source, a plurality of discrete light emitting diodes individually covering one or more wavelength ranges of interest, and one or more broadband light emitting diodes. In embodiments, the calibrated light source comprises a plurality of different types of light sources (e.g., both narrow band light emitting diodes and broadband light emitting diodes). In embodiments, the calibrated light source is calibrated from 300 nm to 2500 nm with a spectrometer prior to insertion into the calibrated sphere so that the calibrations performed thereby are traceable relative to a known calibration standard. In embodiments, a light source (or plurality of light sources) integrated into the calibration assembly 330 is calibrated prior to calibration assembly 330 being integrated into the field spectral radiometer 300. For example, after the calibration assembly 330 is built, a traceable spectral radiometer (e.g., previously calibrated using a calibrated light source) may be positioned in an expected position of the remote sensing head 312 and observe an exit port of the integrating sphere 356. The light source may be calibrated based on the response of the traceable field spectral radiometer.

In embodiments, the integrating sphere 356 may include a diffuse reflective surface defining a cavity in which light emitted by the calibrated light source propagates. The light may reflect off of the diffuse reflective surface such that spectrally uniform calibration light is emitted from an exit port 358 of the integrating sphere 356. A receptacle 360 is attached to the integrating sphere 356 that includes an opening aligned with the exit port 358. As described in greater detail herein with respect to FIGS. 5A, 5B, and 5C, the receptacle 360 is sized to engage with the remote sensing head 312 such that, when the remote sensing head 312 is placed in the stowed position, a sensing window of the remote sensing head 312 is aligned with the exit port 358 to receive the calibration light from the integrating sphere 356 with the optical paths associated with each optical channel are unchanged for calibration of the detectors associated therewith. The calibration sphere 356 is mounted on the base 304 a distance from the end 308 that may be at least a combined length of the second portion 324 of the deployment arm 306, the rotating connection 326, and a portion of the rotating support 316 so that, when the deployment arm 306 is rotated to the stowed position, the sensing window of the remote sensing head 312 and an opening in the receptacle 360 are aligned so that the remote sensing head 312 receives calibration light.

Figure 4:
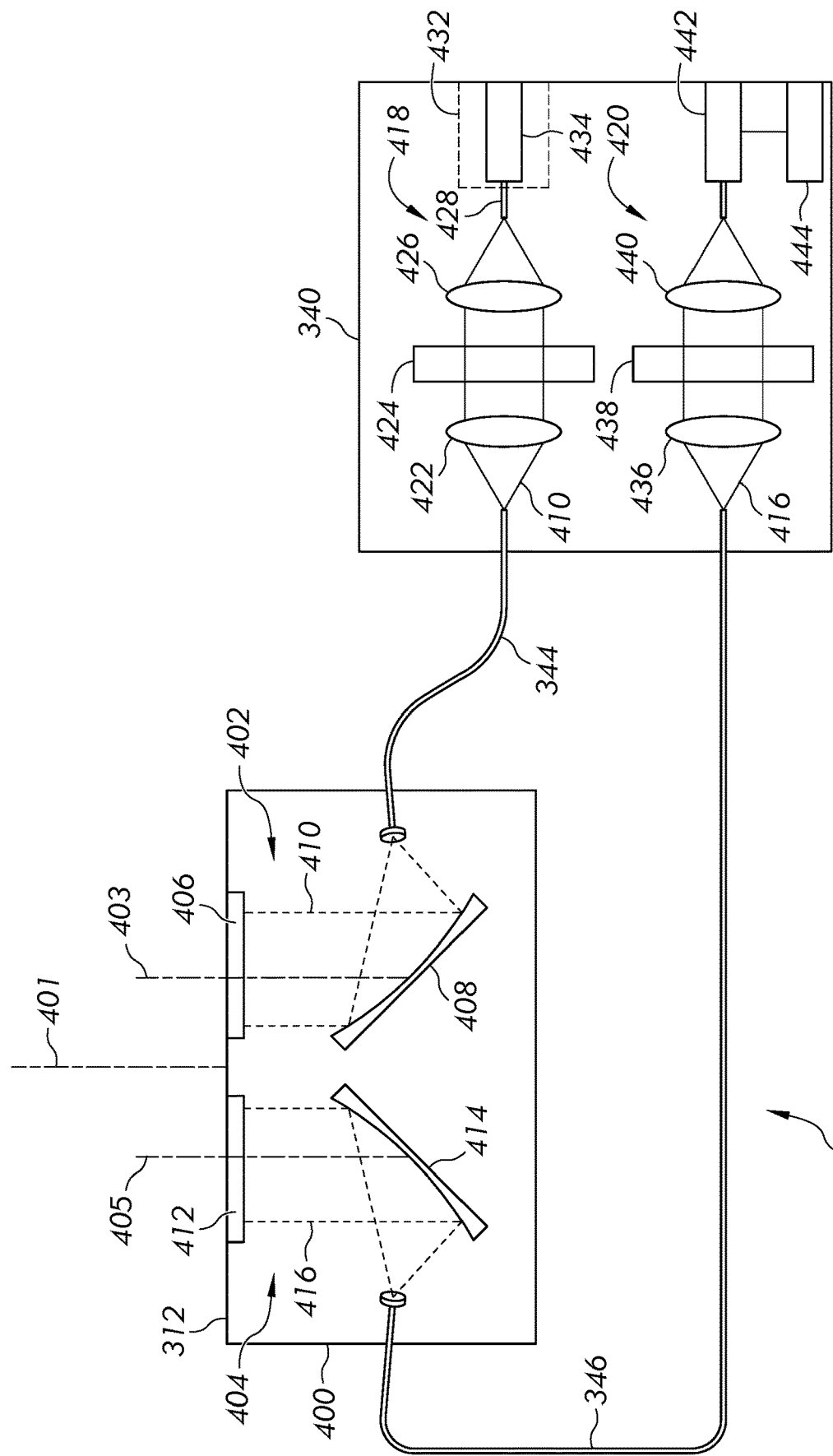
FIG. 4 schematically depicts first and second optical and detection paths associated with first and second optical channels of the field spectral radiometer depicted in FIG. 3A, according to one or more embodiments described herein.

FIG. 4 schematically depicts various components of the remote sensing head 312 and the instrumentation assembly 340 of the field spectral radiometer 300 described herein with respect to FIGS. 3A, 3B, and 3C. As shown, in embodiments, the remote sensing head 312 includes a body 400 that houses optical components defining a first optical path 402 and a second optical path 404. In embodiments, the body 400 includes a central axis 401 defining a viewing angle of the remote sensing head 312. That is, the direction in which the central axis 401 points may define the direction from which light is captured by the remote sensing head 312. For example, if the central axis 401 is pointing towards the surface 301 upon which the field spectral radiometer 300 is disposed (see FIG. 3A) the remote sensing head 312 may take a reflectance measurement of the surface 301. The first and second optical paths 402 and 404 include a first optical axis 403 and a second optical axis 405, respectively. In the depicted embodiment, the first and second optical axes 403 and 405 extend parallel to the central axis 401 and are disposed equidistant from the central axis 401 in a direction perpendicular to the central axis 401. It should be understood that various alternative embodiments are envisioned and contemplated. For example, the axis defining a viewing angle of the remote sensing head 312 may not be centered in the body 400, or the first and second optical axes 403 may not be disposed equidistant from the central axis 401. Moreover, in embodiments, the first and second optical axes 403 may not extend parallel to the central axis 401 (or any other axis defining a general viewing direction of the remote sensing head 312).

The first optical path 402 includes a first viewing window 406 and a first optical element 408, while the second optical path 404 includes a second viewing window 412 and a second optical element 414. In embodiments, the first and second optical elements 408 and 414 are each the same size and shape to define similar fields of view for different optical channels measured thereby. In embodiments, the components of the first and second optical paths 402 and 404 are selected based on the wavelength range of interest associated with the optical channel measured thereby. For example, light 410 associated with a first optical channel is shown to be propagating through the first optical path 402 and light 416 associated with a second optical channel is shown to be propagating through the second optical path 404. In embodiments, the optical components of the first and second optical paths 402 and 404 are selected to filter out light not within a wavelength range of interest associated with a particular optical channel. In embodiments, for example, the first channel is associated with UV/visible/NIR light (e.g., the light 410 has a wavelength that is greater than or equal to 0.3 µm and less than or equal to 1.1 µm), and the first optical element 408 is coated with a UV-enhanced aluminum coating to facilitate the reflection of light at such wavelengths. In embodiments, the first window 406 filters light outside of the wavelength range of interest of the first channel. In embodiments, the second channel is associated with NIR/SWIR light (e.g., the light 416 has a wavelength that is greater than or equal to 0.8 µm and less than or equal to 2.5 µm), and the second optical element 414 is gold coated to facilitate reflection of such wavelengths. In embodiments, the second window 412 filters light outside of the wavelength range of interest of the second channel. In embodiments, the first and second windows 406 and 412 are combined such that the remote sensing head 312 has a single viewing window with the central axis 401 extending through the viewing window. In embodiments, the first and second windows 406 are optical assemblies that condition light from a target prior to entry of the light into the body 400.

As depicted in FIG. 4, the first optical element 408 is a parabolic reflector (e.g., a parabolic mirror offset from the central axis 401 and focuses the light 410 of the first channel towards the first optical fiber 344 of the fiber assembly 342. In embodiments, a tip of the first optical fiber 344 is positioned approximately at a focal point of the first optical element 408 to facilitate coupling. The effective focal length of the first optical element 408 and the diameter of the first optical fiber 344 may determine the effective field of view of the first optical path 402 for the light 410 in the first channel. In embodiments, the effective focal length of the first optical element 408 is approximately 50.8 mm and the first optical fiber 344 may have a core diameter of 200 µm, yielding a field of view in the first channel of 0.225 degrees. The second optical path 404 may be constructed similarly to the first optical path 402 such that the light 416 associated with the second channel is directed into the second optical fiber 346 of the fiber assembly 342 to the instrumentation assembly 340. Specifically, the second optical element 414 is also a parabolic reflector that focuses the light 416 associated with the second channel towards the second optical fiber 346 of the fiber assembly 342. As such, the depicted structure of the remote sensing head 312 facilitates separation of incoming light into separate optical fibers with minimal components, rendering the remote sensing head 312 compact. It should be understood that alternative configurations for coupling the different channels to separate optical fibers are contemplated and within the scope of the present disclosure. Any suitable number of optical components may be used consistent with the present disclosure.

In embodiments, the fields of view of the first and second optical paths 402 and 404 are less than or equal to 0.22 degrees (FWHM). Such relatively narrow fields of view allows the first and second optical paths to be overfilled by the illumination source 102 (e.g., the solar or lunar disc, see FIG. 1) to allow a direct radiance measure of various targets. In embodiments, the effective focal lengths of the first and second optical elements 408 and 414 and/or the sizes of the first and second optical fibers 344 and 346 may be selected to enlarge the fields of view of the first and second optical paths 402 and 404 (e.g., to greater than or equal to 0.53 degrees). Such larger fields of view facilitates the illumination source 102 under-filling each of the first and second optical paths 402 and 404 to allow either the direct radiance or irradiance associated with a particular target to be measured.

Referring still to FIG. 4, the instrumentation assembly 340 is shown to include a first detection path 418 and a second detection path 420. The first detection path 418 receives light from the first optical fiber 344 of the fiber assembly 342, and directs the light 410 associated with the first optical channel to a first detector 434 that receives the light 410 and generates a radiometric signal associated with the first optical channel. The second detection path 420 receives light from the second optical fiber 346 of the fiber assembly 342, and directs the light 416 towards a second detector 442 that receives the light 416 and generates a radiometric signal associated with the second optical channel. Separation of different optical channels into different detection paths facilitates the field spectral radiometer 300 having a high dynamic range for a wide variety of measurements. As described herein, the field spectral radiometer 300 is capable of performing direct radiometric measurements of the solar disc, as well as surface-level spectral reflection (such as from pavement or grass, which may only have a reflectance of a few percentage points). That is, the field spectral radiometer is capable of measuring radiances/irradiances from targets providing light having a wide array of amplitudes. Based on a ratio of typical measured solar disc irradiances and reflectance values from grass or pavement, the dynamic range requirements of the field spectral radiometer 300 may be expressed as $1.5 \times 10^{-6} * SNR_{min}$, with $SNR_{min}$ being a minimum desired signal-to-noise ratio of the radiometric data generated by the field spectral radiometer 300. For example, if a desired minimum signal-to-noise ratio is 10, the dynamic range of the field spectral radiometer 300 may be $1.5 \times 10^{-5}$.

Splitting the first and second optical channels into the first and second detection paths 418 and 420 facilitates achieving such a dynamic range by enabling the use of different detectors optimized for each channel. For example, the first detection path 418 is shown to include a first collimating lens 422, a first optical indexer 424, a first focusing lens 426, a detection fiber 428, and the first detector 434. The first collimating lens 422 collimates light after emittance from the first optical fiber 344. The first optical indexer 424 includes a plurality of intensity-reducing elements so as to render the portion of the light 410 that is transmitted therethrough adjustable to provide the required dynamic range. For example, the first optical indexer 424 may include an open slot with no filtering element, a first neutral density filter transmitting a first relatively low percentage of the light 410 (e.g., 1.0%), a second neutral density filter transmitting a second lower percentage of the light 410 (e.g., 0.1%), a third filter transmitting a third even lower percentage of the light 410 (e.g., 0.01%, as a combination of the first neutral density filter in a pinhole), and a fourth filter transmitting a fourth even lower percentage of the light 410 (e.g., 0.001%. as a combination of the second neutral density filter and the pinhole). Such varying transmittance allows attenuation of relatively high radiance sources (e.g., the solar disk) while still providing the capability of measuring low radiance sources (e.g., reflectance measurements from grass) by not filtering the incoming radiation.

In embodiments, the first detector 434 is a diffraction-based high resolution spectrometer (such as the Ocean Insight QE Pro). Such instrumentation are temperature-sensitive. Accordingly, to maintain the first detector 434 at preferred operating temperature range (e.g., approximately −10° C.) to stabilize the responsivity of the first detector 434, the first detector 434 is housed in a temperature-controlled chamber 432. In embodiments, a body of spectrometer incorporating the first detector 434 is maintained at approximately 20° C. in order to stabilize the response in terms of wavelength registration (e.g., holding the optics and body of the spectrometer at such a temperature may stabilize the optical performance of the spectrometer). Temperature within the temperature-controlled chamber 432 may be controlled via a bi-directional temperature controlling apparatus or the like to facilitate precise measurements by the detector 434. Portions of the light 410 that transmitted through the first optical indexer 424 are focused by the first focusing lens 426 into the detection fiber 428. The detection fiber 428 allows the first optical indexer 424 to be disposed outside of the temperature-controlled chamber 432 and permits flexibility for the overall design of the instrumentation assembly 340.

Referring still to FIG. 4, the second detection path 420 is shown to include a second collimating lens 436, a second optical indexer 438, a second focusing lens 430, and a second detector 442. The second collimating lens 436 collimates light after emittance from the second optical fiber 346. The second optical indexer 438 includes a plurality of bandpass filters that transmit different spectral portions of the light 416 depending on the application. Each bandpass filter may transmit a different spectral band of light, which each spectral band of light having a different center wavelengths. In embodiments, the second optical indexer 438 comprises eight bandpass filters emitting bands centered at 865 nm (for NIR measurement applications), 1240 nm (e.g., for measurement of cloud particulate sizes), 1375 nm (e.g., for cloud detection), 1605 nm (e.g., for detection of water in the atmosphere), 1660 nm (e.g., for mineral detection), 2130 nm (e.g., for detection of dust and aerosols), 2215 nm (e.g., detection of hydrocarbons), and 2250 nm (e.g., for cloud detection). Various other sets and combinations of bandpass filters are contemplated and within the scope of the present disclosure. In embodiments, the second optical indexer 438 includes a bandpass filter emitting spectral bands associated with the first optical path 402 to facilitate crossover measurements (e.g., where the optical signals typically measured via the first detection path 418 are measured via the second detection path 420). Such crossover measurements enables comparison of the detection signals generated via the first and second detection paths 418 and 420 and adjustment of the detection paths 418 and 420 for alignment.

After filtration via the second optical indexer 438, the second focusing lens 440 focuses the filtered light 416 onto the second detector 442 for generation of radiometric data. In embodiments, the second detector 442 is semiconductor alloy-based detector (e.g., constructed of InGaAs). A pinhole may be provided in front of the second sensor 442 if needed to prevent saturation. In the depicted embodiment, the longer wavelength, second channel is measured using a filtered single-channel radiometer to provide sensitivity, a relatively high signal-to-noise ratio, and stability for measurements in the second channel. The second detector 442 may be temperature regulated with an integrated thermal-electric element 444 to precisely control the temperature of the semiconductor alloy-based detector (e.g., at approximately 60° C.) to ensure low uncertainty measurements. While the depicted embodiment includes a single channel radiometer/filter combination for the second channel, it should be understood that alternative embodiments where a multi-channel spectral radiometer is used for measurements of the second channel is contemplated and within the scope of the present disclosure. While, in the depicted embodiment, the first and second detection paths 418 and 420 include a single filter indexer, it should be understood that embodiments are envisioned where the first and second detection paths 418 and 420 include a plurality of filter indexers disposed in series to achieve different combinations of attenuation, bandpass, or both attenuation and bandpass.

Figure 5A:
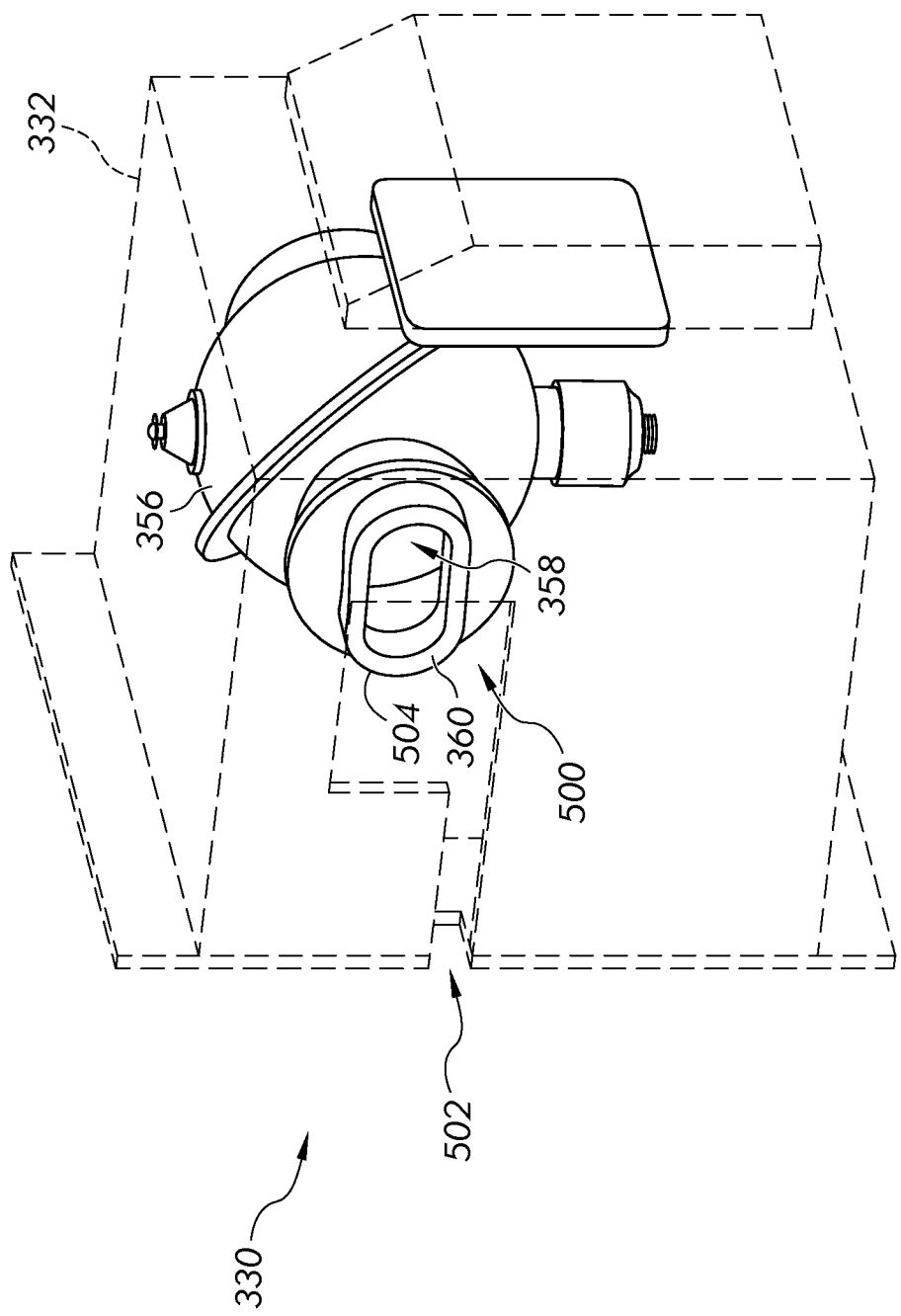
FIG. 5A schematically depicts a calibration assembly of the field spectral radiometer depicted in FIG. 3A, according to one or more embodiments described herein.
Figure 5B:
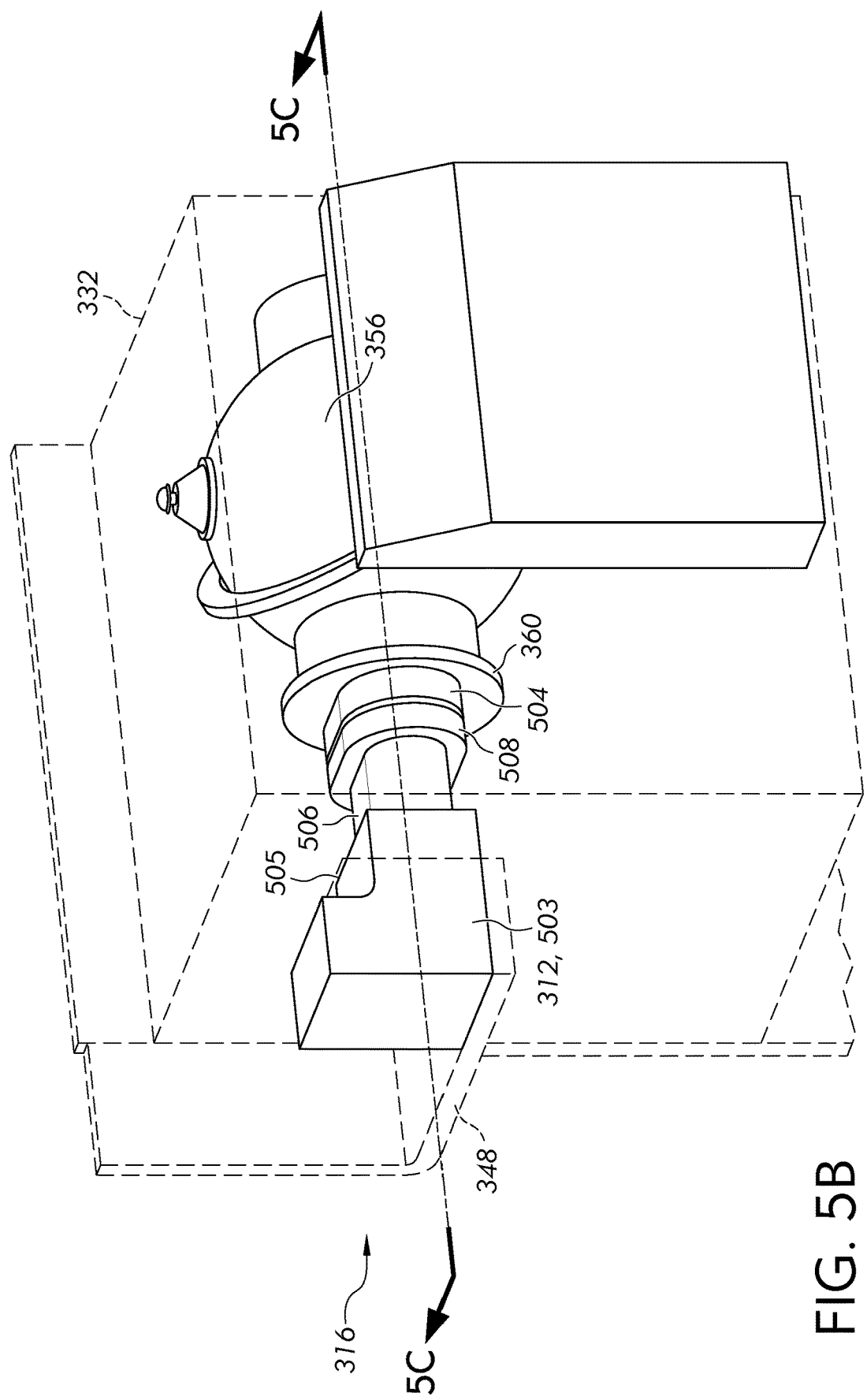
FIG. 5B schematically depicts the calibration assembly of FIG. 5A interlocked with a remote sensing head of the field spectral radiometer of FIG. 3A in a calibrating position, according to one or more embodiments described herein.
Figure 5C:
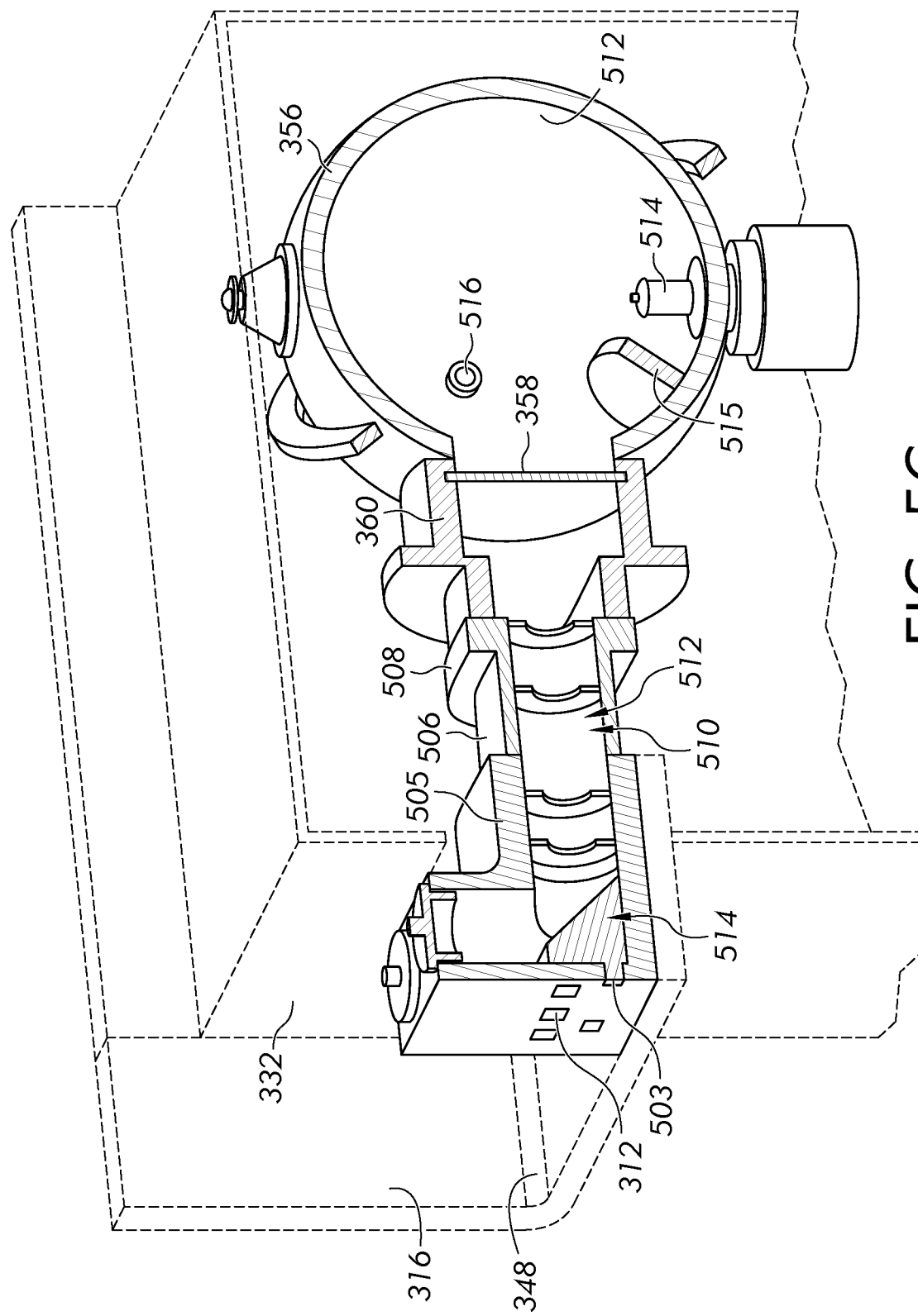
FIG. 5C schematically depicts a cross-sectional view of the calibration assembly and the remote sensing head through the line 5-5 depicted in FIG. 5B, according to one or more embodiments described herein.

FIGS. 5A, 5B, and 5C depict views of the calibration assembly 330 of the field spectral radiometer 300 described herein. FIG. 5A depicts a perspective view of the integrating sphere 556 disposed in the housing 332. FIG. 5B depicts a perspective view of the calibration assembly 330 when the remote sensing head 312 is disposed therein in a calibration position. FIG. 5C depicts a cross-sectional view of the calibrating assembly 330 with the remote sensing head 312 stowed in the calibration position depicted in FIG. 5B. As depicted in FIG. 5A, the housing 332 includes an opening 500 providing access to the exit port 358 of the integrating sphere 356. The opening 500 further includes a narrow portion 502 for receiving a portion of the rotating support 316 when the remote sensing head 312 is placed in the stowed position. The opening 500 (including the narrow portion 502) may have a peripheral shape that conforms to the remote sensing head 312 and the rotating support 316 to close off the volume enclosed within the housing 332. Such a configuration ensures that the remote sensing head 312 is protected when stowed and not in use.

The receptacle 360 for the remote sensing head 312 is further shown to include a gasket material 504. The gasket material 504 may be a compliant material (e.g., a compressive foam or the like) disposed at an end of the receptacle 360 that engages with the remote sensing head 312. When placed in the stowed position, the remote sensing head 312 may compress the gasket material 504 to seal off the optical path extending from within the integrating sphere 356 to the optical paths (e.g., the first and second optical paths 402 and 404 described with respect to FIG. 4) within the remote sensing head 312. Such a configuration ensures an accurate calibration by preventing external environmental light from adding to and in turn influencing the overall resulting signal measured by the field spectral radiometer 300 in a calibration routine.

As depicted in FIG. 5B, when the second portion 324 of the deployment arm 306 (see FIG. 3A) is in the stowed position, the remote sensing head 312 and the support platform 348 of the rotating support 316 are inserted into the opening 500. The volume enclosed within the housing 332 is substantially sealed off such that light from the external environment is prevented from entering the volume. The remote sensing head 312 comprises a main body 503 and an extension 505 extending from the main body 503. The main body 503 may house the components defining the first and second optical paths 402 and 404 described herein with respect to FIG. 4 (e.g., the first and second optical elements 408 and 414), and generally be larger in cross-sectional area than the extension 505. The extension 505 is inserted into the opening 500 in the housing 332 in conjunction with the support platform 348 of the rotating support 316. The extension 505 may include an optics housing 506 disposed therein in which optical components of the first and second optical paths 402 and 404 described herein with respect to FIG. 4 are disposed. The optics housing 506 includes an engagement lip 508 at an end thereof for engaging with the gasket material 504 for forming a seal with the receptacle 360.

FIG. 5C depicts various additional aspects of the calibration assembly 330 and the remote sensing head 312 in more detail. For example, as depicted in FIG. 5C, the integrating sphere 356 includes a diffuse internal surface 512 substantially enclosing a reflective cavity. A calibrated light source 514 is disposed within the volume defined by the diffuse internal surface 512. The integrating sphere 356 further includes a calibration light baffle 515 that blocks light from the calibrated light source 514 from being directly emitted through the exit port 358 without reflecting off the diffuse internal surface 512. The calibration light baffle 515 ensures that the calibration light emitted by the integrating sphere 356 is diffuse and lacks a directionality based on the placement of the calibrated light source 514.

The integrating sphere 356 also includes a calibration monitor detector 516 that monitors the calibrated light source 514 during calibrations of the remote sensing head 312 to ensure calibration signals from the calibrated light source 514 are traceable to applicable calibration standards. In embodiments, the calibration monitor detector 516 is configured to collect a portion of the light emitted by the calibrated light source 514 and direct the collected portion to a calibration detector (not depicted) coupled thereto. In embodiments, the calibration detector is disposed in the instrumentation assembly 340 (see FIG. 3A) and the light emitted by the calibrated light source 514 is guided to the instrumentation assembly 340 by an optical fiber. In embodiments, to generate high fidelity calibration measurements throughout the spectral range emitted by the calibrated light source 514, the calibration detector is a silicon-based photodetector. Such detectors are beneficial in that they have relatively high thermal stability as compared other types of detectors. In embodiments, the calibration detector is further stabilized through mechanical/thermal coupling with a thermal control plate. Through the incorporation of the calibrated light source 514 and the calibration monitor detector 516, it is ensured in real-time that the calibrations of the remote sensing head 312 obtained via the calibration assembly 330 are accurate and traceable back to applicable standards.

While the integrating sphere 356 is beneficial in that it permits calibration of the remote sensing head 312 across a wide spectral range in a directionally-independent manner, it should be understood that embodiments where the calibration assembly 330 does not include an integrating sphere are contemplated and within the scope of the present disclosure. For example, in embodiments, the calibration assembly 330 includes a plurality of calibration light sources, and the remote sensing head 312 may be sequentially calibrated in a plurality of different spectral bands of interest. Any suitable calibration light source with traceability back to appropriate calibration standards may be used to provide light to the remote sensing head 312 when in the stowed position.

Alternative structures to the remote sensing head 312 are contemplated and within the scope of the present disclosure. For example, in embodiments, the optical assembly 510 is integrated into the extension 505 of the remote sensing head 312 and the optics housing 506 is not included (e.g., the extension 505 may directly contact the receptacle 360). In embodiments, the optical assembly 510 includes separate subassemblies for each optical channel measured (e.g., specifically adapted to condition light in the spectral range of interest associated with each channel). In embodiments, the remote sensing head 312 does not contact the receptacle 360 directly or indirectly via the optics housing 506 such that light from the integrating sphere 356 traverses a gap within the housing 332 prior to reaching the remote sensing head 312. In embodiments, the calibration assembly 330 includes an optical assembly configured to condition the calibration light prior to reaching the remote sensing head 312 (e.g., the receptacle 360 may include optical components configured to focus or collimate the calibration light).

Figure 6:
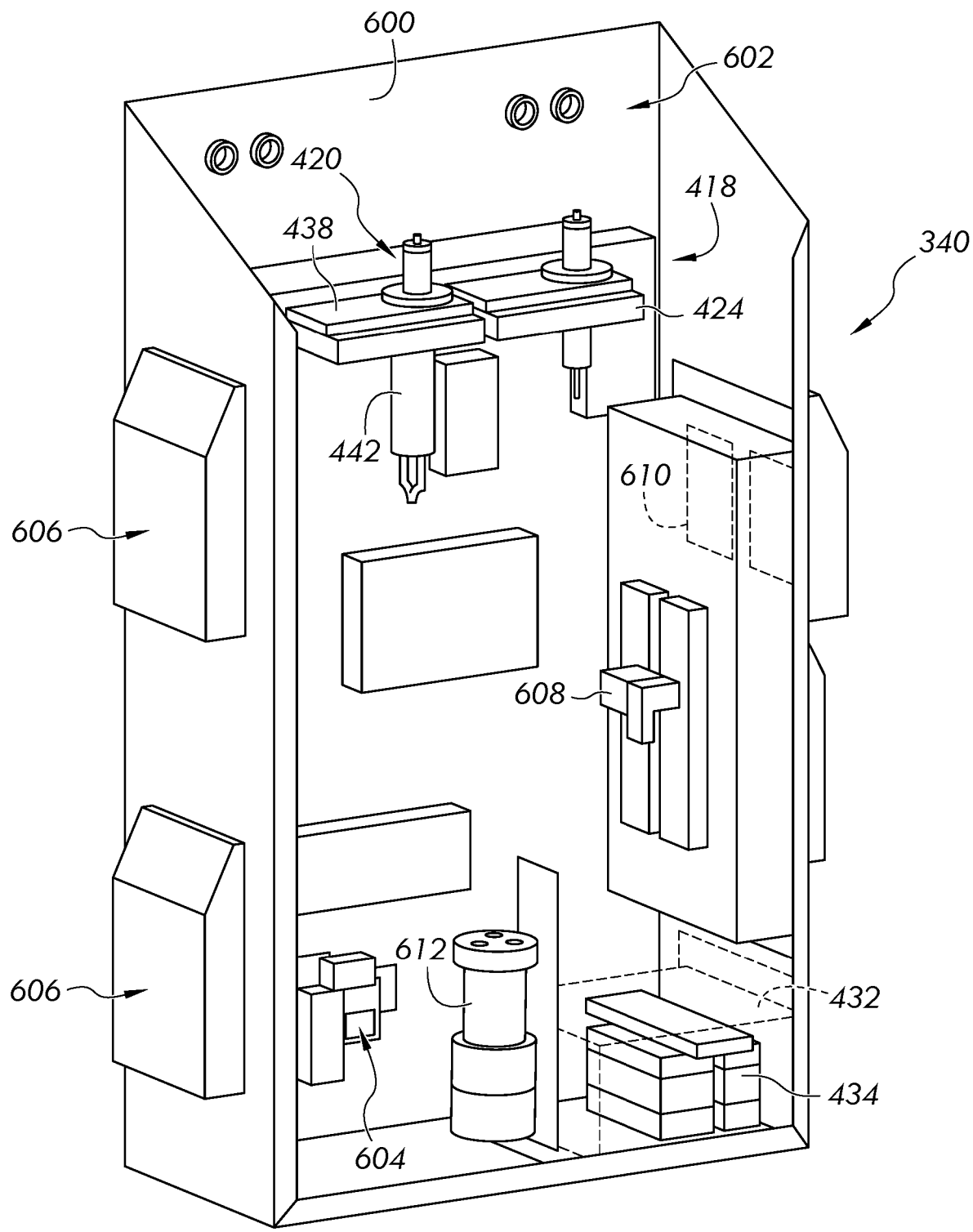
FIG. 6 schematically depicts a cross-sectional view of an instrumentation assembly of the field spectral radiometer depicted in FIG. 3A, according to one or more embodiments described herein.

Referring now to FIG. 6, a cross-sectional view of the instrumentation assembly 340 is shown in greater detail. The instrumentation assembly 340 includes a housing 600 substantially enclosing a volume 602 in which detectors associated with the remote sensing head 312 and the calibration assembly 330 described herein are disposed. The volume 602 is temperature-controlled via a heater 604 (e.g., a resistive heating element) and a plurality of thermostat controlled fans 606 that vent air from the volume 602. In embodiments, the temperature within the volume 602 is maintained to between 20 degrees Centigrade and a value that is close to external ambient temperature, whichever is higher.

A calibration detector 608 is disposed on a bi-directionally controlled temperature-controlled block 610 (e.g., including fans and heaters disposed therein to conductively control the temperature of the calibration detector 608). The calibration detector 608 may be a fiber-fed silicon-based photodetector receiving light from the calibration monitor detector 516 described with respect to FIG. 5C. The first detection path 418, including the first optical indexer 424, is disposed inside of the volume 602. The detection fiber 428 (not depicted in FIG. 6) may provide light directed through the first optical indexer 424 to the first detector 432, which, as described herein, is disclosed in the temperature-controlled chamber 432. In embodiments, the temperature-controlled block 610 and the temperature-controlled chamber 432 are both controlled via a bi-directional thermal control subsystem 612. The bi-directional thermal control subsystem 612 may maintain a temperature within the temperature-controlled chamber 434 at approximately 20° C. (e.g., within 1° C. thereof) to facilitate sensitive operation of the first detector 434.

The second detection path 420, including the second optical indexer 438 and the second detector 442 are also disposed within the volume 602. In embodiments, the second detector 442 includes an integrated thermal-electric element (e.g., the thermal electron element 444 depicted in FIG. 4) to maintain the temperature of the second detector 442 within a desired operating range (e.g., approximately −55° C.). As such, the elements associated with the detection paths of each optical channel measured via the field spectral radiometer 300 is housed within the temperature-controlled volume 602, and temperature-sensitive components of each detection path may each be independently temperature-controlled to ensure each temperature-sensitive component is operating within a desired range to ensure sensitivity in the measurements by each optical channel. By separating the detection instrumentation from the light-collecting instrumentation, the field spectral radiometer 300 provides a high degree of viewing angle flexibility while providing high dynamic range capabilities for low uncertainty measurement across a plurality of optical channels.

Figure 7:
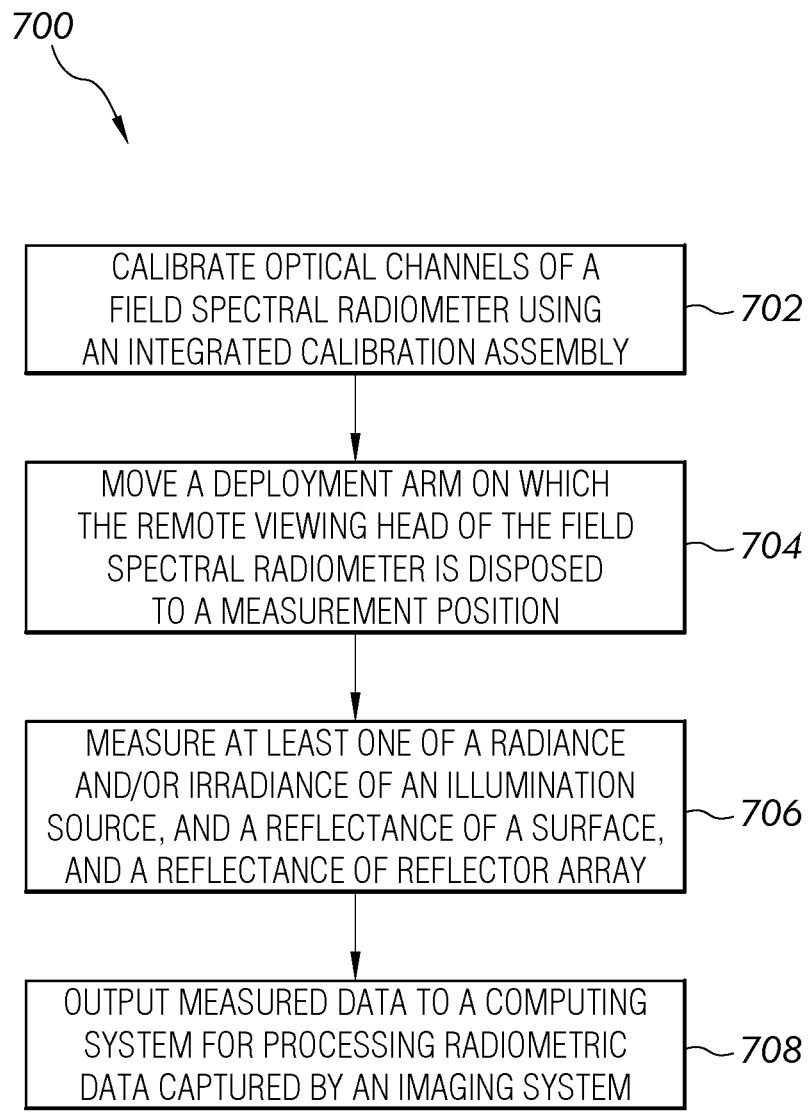
FIG. 7 depicts a flow diagram for calibrating an imaging system using a field spectra radiometer, according to one or more embodiments described herein.

FIG. 7 depicts a flow diagram of a method 700 for providing data measured by a field spectral radiometer for processing radiometric data captured by an imaging system. In embodiments, the method 700 may be performed via the imager characterization system 100 described herein with respect to FIG. 1, using the field spectral radiometer 300 described with respect to FIG. 3 as the field spectral radiometer. Performance of the method 700 may result in the collection of data in the field spectral radiometer 300 and the provision of that data to a computing system also communicably coupled to the imaging system 112 so that the computing system may perform various post-processing operations on radiometric data collected by the imaging system 112 (e.g., from light from the illumination source 102 reflected off the reflector array 104).

In a step 702, optical channels of the field spectral radiometer 300 are calibrated using the calibration assembly 330. In embodiments, a starting position for the remote sensing head 312 is in the stowed position depicted in FIGS. 5A and 5B, where the remote sensing head 312 is at least partially inserted into the housing 332 of the calibration assembly 330. That is, the deployment arm 306 of the support structure 302 may be rotated such that the remote sensing head 312 is inserted into the opening 500 in the housing 332 (see FIG. 5A). Such a starting position is beneficial between fields of measurement because the engagement of the remote sensing head 312 with the integrating sphere 356 (e.g., at the gasket material 504 on the receptacle) may seal off of the optical elements associated with the remote sensing head 312 and protect the optical elements from external debris. In embodiments, the field spectral radiometer 300 may be moved the stowed calibration position from a measurement position to commence performance of the method 700.

Once the remote sensing head 312 is disposed in the calibration assembly 330 in alignment with the calibration light source (e.g., the integrating sphere 356 and the calibrated light source 514), a procedure may be performed to calibrate each optical channel measured via the remote sensing head 312. In embodiments, after the remote sensing head 312 is stowed in the calibration assembly 330, the calibrated light source 514 is allowed to warm up, and the performance of the calibrated light source 514 is monitored via the calibration monitor detector 516. The calibration monitor detector 516 may collect light that reflects off the diffuse internal surface 512 of the integrating sphere 356 and focus the collected light into an optical fiber, which conveys the collected light to the instrumentation assembly 340. As described herein, the instrumentation assembly 340 houses a calibration detector 608 (see FIG. 6) that generates a monitoring signal based on the collected light generated by the calibrated light source 514. Additionally, electronic feedback from the calibrated light source 514, including operating current and voltage, is also be monitored.

Once it is determined that the calibrated light source 514 is in a stable operational state (e.g., a controller associated with the field spectral radiometer 300 disposed in the instrumentation assembly 340 may monitor the signals generated via the calibration detector 608 and the electronic feedback from the calibration lamb 514), each optical channel measured by the remote sensing head 312 is evaluated. For example, in embodiments, the remote sensing head 312 collects light emitted from the integrating sphere 356 using first and second optical paths 402 and 404 described herein with respect to FIG. 4. Different spectral portions of the calibration light is guided down a different optical fiber of the fiber assembly 342 into the first and second detection paths 418 and 420 (see FIG. 4). The signals generated by the first detector 434 and the second detector 442 are collected and compared to a calibration reference for each filter position of the first and second optical indexers 424 and 438. As described herein, the calibration lamp 414 is calibrated in a manner traceable to applicable standards. The calibration performed via the calibration assembly 330 may be a direct-transfer calibration assembly, traceable to applicable standards to ensure low uncertainty collection of subsequent data by the field spectral radiometer 300. In embodiments, each filter combination of the first and second optical paths 402 and 404 may be engaged during calibration via the calibration assembly 330.

In a step 704, the deployment arm 306 of the support structure 302 is moved to a measurement position. The deployment arm 306 is rotated relative to the base 304 via the actuator 337 disposed at the rotating connection 326 of the deployment arm 306. An end of the second portion 324 of the deployment arm 306 rotates about the deployment axis 328 (see FIG. 3B) such that the remote sensing head 312 rotates away from the base 304 to the measurement positon. In embodiments, the rotating support 316 is adjusted (e.g., about the first and second axes of rotation 318 and 320) to place a viewing axis of the remote sensing head 312 (e.g., the central axis 412 depicted in FIG. 412) in a desired measurement direction.

In a step 706, measurements of at least one of a radiance and/or irradiance of the illumination source 102, a reflectance of a surface (e.g., a bi-directional reflectance function of the surface 301 on which the field spectral radiometer 300 is disposed), and a reflectance of the reflector array 104 is captured via the field spectral radiometer 300. The deployment arm 306 and the rotating support 316 may be moved to various viewing positions and angles to capture light either directly from the illumination source 102 or light reflected from the surface 301 or the reflectors of the reflector array 104. Measurements may be taken using various filter settings of the first and second optical indexers 424 and 438 of the first and second detection paths 418 and 420 to ensure operation within the measurement capabilities of the first and second detectors 434 and 442 or perform measurement in multiple wavelength ranges of interest for various applications (e.g., measuring cloud cover). In embodiments, measurements via the remote sensing head 312 are guided using the camera 314, which may capture images to verify that a desired target area is being imaged by the remote sensing head 312. In embodiments, images captured by the camera 314 may also be used to evaluate the imaged area for obstructions (e.g., clouds) or to inform the quality or resulting measurement uncertainty of the radiometric results measured via the remote sensing head 312.

In a step 708, data measured by the field spectral radiometer 300 is output to a computing system for processing radiometric data captured by the imaging system 112. For example, the imager characterization system 100 may be a calibration node of a calibration network that are interconnected with one another to perform various characterizations of imaging systems while in use. Such nodes (or a portion thereof) may be connected to a computing system for calibration scheduling and data management. For example, measurements captured via the remote sensing head 312 are timed based on scheduled collections of radiometric data via the imaging system 112. As described herein, the imaging system may capture light reflected via the reflector array 104 in a scheduled manner. Measurements via the field spectral radiometer 300 may beneficially be taken into account in processing data collected via the imaging system 112 from such reflections from the reflector array 104 to incorporate dependencies of the collected data on atmospheric conditions, angles of incidence, and reflectance values. Real-time correction of the data collected via the imaging system 112 allows for low uncertainty measurements of real-time imaging system performance.

As will be understood from the foregoing description, low uncertainty radiometric data collection across a wide spectral range is rendered possible by separating a plurality of optical channels into different optical paths at a remote sensing head. Each optical channel may be provided to a separate optical fiber such that light from a target associated with each channel is guided to a separate fiber-fed detection path disposed in a temperature-controlled volume. Each detection path may include a detector specifically configured for measuring light in that optical channel, and include optical elements for conditioning the light in that channel prior to detection. Moreover, the detectors for each of the channels may be individually temperature-controlled to eliminate thermal variations in the measurements. Additionally, a calibration assembly emitting calibration light extending throughout a spectral range of all of the measured optical channels may be included such that each optical path may be calibrated during deployment in a manner that is traceable back to an appropriate calibration channel. The calibration assembly may also serve as a housing for the remote sensing head when it is not in use, protecting the remote sensing head from the external environment. By providing a multi-channel sensor with a high dynamic range, the spectral radiometers described herein facilitate taking a plurality of radiance, irradiance, and reflectance measurements of an environment of a reflector array in the process of characterizing an imaging system.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A field spectral radiometer comprising:
a support structure
a remote sensing head disposed on the support structure, the remote sensing head comprising:
a central axis defining a viewing direction of the field spectral radiometer;
a first optical element disposed on a first side of the central axis, the first optical element defining a first optical path for a first optical channel; and
a second optical element disposed on a second side of the central axis, the second optical element defining a second optical path for a second optical channel, wherein the first and second optical channels are associated with different wavelength ranges of interest; and
an instrumentation assembly disposed on the support structure, the instrumentation assembly comprising a first detection path associated with the first optical channel and a second detection path associated with the second optical channel, the first detection path comprising a first optical indexer to filter light reflected by the first optical element, the second detection path comprising a second optical indexer to filter light reflected by the second optical element.

2. The field spectral radiometer of claim 1, wherein:
the first optical channel extends through a first wavelength range of interest comprising wavelengths greater than or equal to 0.3 µm and less than or equal to 1.1 µm; and
the second optical channel extends through a second wavelength range of interest comprising wavelengths greater than or equal to 0.8 µm and less than or equal to 2.5 µm.

3. The field spectral radiometer of claim 2, wherein the first detection path comprises a diffraction-based spectrometer disposed downstream of the first optical indexer, wherein the second detection path comprises a temperature-controlled semiconductor alloy-based detector disposed downstream of the second optical indexer.

4. The field spectral radiometer of claim 3, wherein the temperature-controlled semiconductor alloy-based detector is constructed of InGaAs.

5. The field spectral radiometer of claim 3, wherein the first optical indexer comprises a plurality of neutral-density filters having varying degrees of transmission of light within the first optical channel.

6. The field spectral radiometer of claim 2, wherein the second optical indexer comprises a plurality of band pass filters configured to transmit light in different portions of the second wavelength range of interest at a plurality of different central wavelengths.

7. The field spectral radiometer of claim 1, wherein the first and second optical elements are parabolic reflectors focusing light in the first and second optical channels into optical fibers, the optical fibers extending between remote sensing head and the instrumentation assembly.

8. The field spectral radiometer of claim 1, wherein a dynamic range of the field spectral radiometer is greater than or equal to $1.5 \times 10^5$.

9. The field spectral radiometer of claim 1, wherein the support structure comprises a stationary arm and a deployment arm attached to an end of the stationary arm, the deployment arm comprising a joint connecting a first portion of the deployment arm to a second portion of the deployment arm, the first portion being attached to the end of the stationary arm, wherein the remote sensing head is disposed at an end of the second portion.

10. The field spectral radiometer of claim 9, further comprising a calibration light source disposed on the stationary arm, wherein the deployment arm rotates at the joint such that the second portion rotates towards the stationary arm to place the remote sensing head into alignment with the calibration light source.

11. The field spectral radiometer of claim 10, wherein the calibration light source is disposed in a housing, the housing comprising an opening that confirms in shape with an external surface of the remote sensing head, wherein the remote sensing head is inserted into the opening when in a calibrating position in alignment with the calibration light source.

12. The field spectral radiometer of claim 10, wherein the calibration light source comprises an integrating sphere with a calibration lamp disposed therein.

13. A field spectral radiometer comprising:
a base;
a deployment arm extending from an end of the base, the deployment arm comprising a first portion connected to the base, a second portion, and a rotating connection extending between the first portion and the second portion, the rotating connection defining a first axis of rotation extending in a first direction;
a rotating support coupled to an end of the second portion;
a remote sensing head coupled to the rotating support, wherein the rotating support includes elements that are adjustable to control a pan and a tilt of the remote sensing head; and
a calibration assembly disposed on the base, the calibration assembly comprising a calibrating light source comprising an opening, wherein the deployment arm rotates about the first axis of rotation such that the second portion rotates relative to the first portion to place the remote sensing head in a calibrating position where a field of view of the calibration assembly receives light from the calibrating light source.

14. The field spectral radiometer of claim 13, wherein the calibration light source comprises an integrating sphere with a calibration lamp disposed therein.

15. The field spectral radiometer of claim 13, wherein the remote sensing head comprises:
a central axis defining a viewing direction of the field spectral radiometer;
a first optical element disposed on a first side of the central axis, the first optical element defining a first optical path for a first optical channel; and
a second optical element disposed on a second side of the central axis, the second optical element defining a second optical path for a second optical channel, wherein the first and second optical channels are associated with different wavelength ranges of interest.

16. The field spectral radiometer of claim 15, further comprising an instrumentation assembly disposed on the base, the instrumentation assembly comprising a first detection path associated with the first optical channel and a second detection path associated with the second optical channel, the first detection path comprising a first optical indexer to filter light reflected by the first optical element, the second detection path comprising a second optical indexer to filter light reflected by the second optical element.

17. The field spectral radiometer of claim 16, wherein:
the first optical channel extends through a first wavelength range of interest comprising wavelengths greater than or equal to 0.3 µm and less than or equal to 1.1 µm;
the second optical channel extends through a second wavelength range of interest comprising wavelengths greater than or equal to 0.8 µm and less than or equal to 2.5 µm;
the first detection path comprises a diffraction-based spectrometer disposed downstream of the first optical indexer; and
the second detection path comprises a temperature-controlled semiconductor alloy-based detector disposed downstream of the second optical indexer.

18. The field spectral radiometer of claim 13, wherein a dynamic range of the field spectral radiometer is greater than or equal to $1.5 \times 10^5$.

19. A method of calibrating a remote sensing system, the method comprising:
measuring a solar radiance, an atmospheric transmission, and a reflectance of a surface using a multi-channel field spectral radiometer by manipulating a field of view of the multi-channel field spectral radiometer while collecting radiometric data, wherein the multi-channel field spectral radiometer comprises a remote sensing head coupled to a base via a deployment arm, the multi-channel field spectral radiometer receiving light within the remote sensing head and providing light to detectors of an instrumentation assembly attached to the base;
reflecting solar light towards the remote sensing system via a reflector array;
receiving an image signal from the remote sensing system generated from the reflected solar light; and
adjusting the image signal based on at least one of the solar radiance, the atmospheric transmission, the reflectance of the surface measured via the multi-channel field spectral radiometer.

20. The method of claim 19, further comprising calibrating the multi-channel field spectral radiometer by rotating the deployment arm with respect to the base to place the remote sensing head in a calibrating position where a calibrating light source disposed on the base is within a field of view of the remote sensing head.

* * * * *